United States Patent [19]

Kumagai

[11] Patent Number: 5,462,026
[45] Date of Patent: Oct. 31, 1995

[54] THROTTLE VALVE ASSEMBLY WITH TRACTION CONTROL DEVICE

[75] Inventor: Masato Kumagai, Atsugi, Japan

[73] Assignee: Unisia Jecs Corporation, Atsugi, Japan

[21] Appl. No.: 351,075

[22] Filed: Nov. 30, 1994

[30] Foreign Application Priority Data

Feb. 9, 1994 [JP] Japan .................. 6-036593

[51] Int. Cl.⁶ .................................................. F02D 7/00
[52] U.S. Cl. .................................. 123/396; 180/197
[58] Field of Search ........................... 123/396, 399, 123/565, 198 D, 350, 400; 180/197

[56] References Cited

U.S. PATENT DOCUMENTS

| | | | |
|---|---|---|---|
| 4,750,582 | 6/1988 | Maas | 180/197 |
| 4,848,505 | 7/1989 | Yoshizawa et al. | 180/197 |
| 4,951,771 | 8/1990 | Maehara | 180/197 |
| 5,020,496 | 6/1991 | Huber et al. | 123/399 |
| 5,040,508 | 8/1991 | Watanabe | 123/396 |
| 5,131,362 | 7/1992 | Simon et al. | 123/396 |
| 5,154,150 | 10/1992 | Vieira | 123/396 |
| 5,235,950 | 8/1993 | Schmitt et al. | 123/396 |
| 5,265,572 | 11/1993 | Kadomukai et al. | 123/396 |
| 5,297,521 | 3/1994 | Sasaki et al. | 123/396 |

*Primary Examiner*—Raymond A. Nelli
*Attorney, Agent, or Firm*—Foley & Lardner

[57] ABSTRACT

A throttle valve assembly comprises a body defining an air intake passage therein; a valve proper pivotally installed in the air intake passage to control the amount of air flowing therethrough; a first valve actuator for pivoting the valve proper in accordance with a first information; a second valve actuator for pivoting the valve proper in accordance with a second information, the second valve actuator having a rest condition wherein the function of the second valve actuator is fully lost; and a biasing spring for forcing the second valve actuator to take the rest condition when the second valve actuator gets out of order.

14 Claims, 6 Drawing Sheets

THROTTLE VALVE ASSEMBLY WITH TRACTION CONTROL DEVICE

BACKGROUND OF THE INVENTION

1. Field of the Invention

The present invention relates to throttle valve assemblies of an automotive internal combustion engine. More specifically, the present invention relates to throttle valve assemblies of a type which has a traction control device for preventing skidding of driving wheels of the vehicle.

2. Description of the Prior Art

In general, a throttle valve assembly comprises a body forming an air intake passage led to the engine, a valve proper pivotally installed in a throttle chamber defined in the air intake passage and a valve actuating mechanism for actuating the valve proper in response to movement of an accelerator pedal. That is, in accordance with the movement of the accelerator pedal, the throttle valve is pivoted to control or adjust the air flow area of the throttle chamber thereby to control the output of the engine.

Nowadays, some of the throttle valve assemblies are of a type having a traction control device (or valve opening restricting device) which prevents skidding of driving wheels of the vehicle. Usually, the traction control device has a drive lever interposed between the valve actuating mechanism and the valve proper. The drive lever is driven by an electric motor. Upon receiving a control signal representing a certain running condition of the vehicle, the motor turns the drive lever in such a manner as to reduce the open degree of the valve proper more than that intended by the valve actuating mechanism. With this, the output of the engine is lowered and thus the driving torque applied to the driving wheels is temporarily reduced, resulting in prevention of the undesired skidding of the wheels.

However, due to its inherent construction, such throttle valve assembly tends to have the following drawback.

That is, in the traction control device as mentioned hereinabove, in order to restrict the open degree of the valve proper, the drive lever is turned by energizing the motor. Thus, if, with the open degree of the valve proper being restricted by a certain percent (for example, 50%) by the traction control device, the drive lever fails to operate due to damage of the motor or the like, the restriction of the open degree becomes fixed at such certain percent (50%) and thus thereafter the output of the engine is remarkably lowered. That is, the maximum output of the engine would be reduced to about 50% of the normal maximum power.

SUMMARY OF THE INVENTION

Therefore, it is an object of the present invention to provide a throttle valve assembly with a traction control device, which is free of the above-mentioned drawback.

According to a first aspect of the present invention, there is provided a throttle valve assembly which comprises a body defining an air intake passage therein; a valve proper pivotally installed in the air intake passage to control the amount of air flowing therethrough; a first valve actuator for pivoting the valve proper in accordance with a first information; a second valve actuator for pivoting the valve proper in accordance with a second information, the second valve actuator having a rest condition wherein the function of the second valve actuator is fully lost; and first means for forcing the second valve actuator to take the rest condition when the second valve actuator gets out of order.

According to a second aspect of the present invention, there is provided a throttle valve assembly which comprises a body defining an air intake passage therein; a valve proper pivotally installed in the air intake passage to control the amount of air flowing therethrough; a pivotal wire drum connected to an accelerator pedal through a wire; a rotation lever connected to the wire drum to pivot therewith, the rotation lever having at its one end a second pin; a link plate pivotally held at its middle portion by a third pin, the link plate having at one end a first opening and at the other end a second opening, the second opening being pivotally engaged with the second pin; a rotation plate connected to the valve proper to pivot therewith, the rotation plate having a first pin which is pivotally engaged with the first opening of the link plate; a drive lever pivotally supported at its center portion by the body, the drive lever having at its radially extending portion the third pin; an electric motor having an output shaft; gear means arranged between the output shaft of the motor and a radially extending portion of the drive lever so that rotation of the output shaft induces a pivot movement of the drive lever; and a spring for biasing the drive lever to pivot in a direction to pivot the link plate about the second pin in a direction to increase the open degree of the valve proper through the rotation plate.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
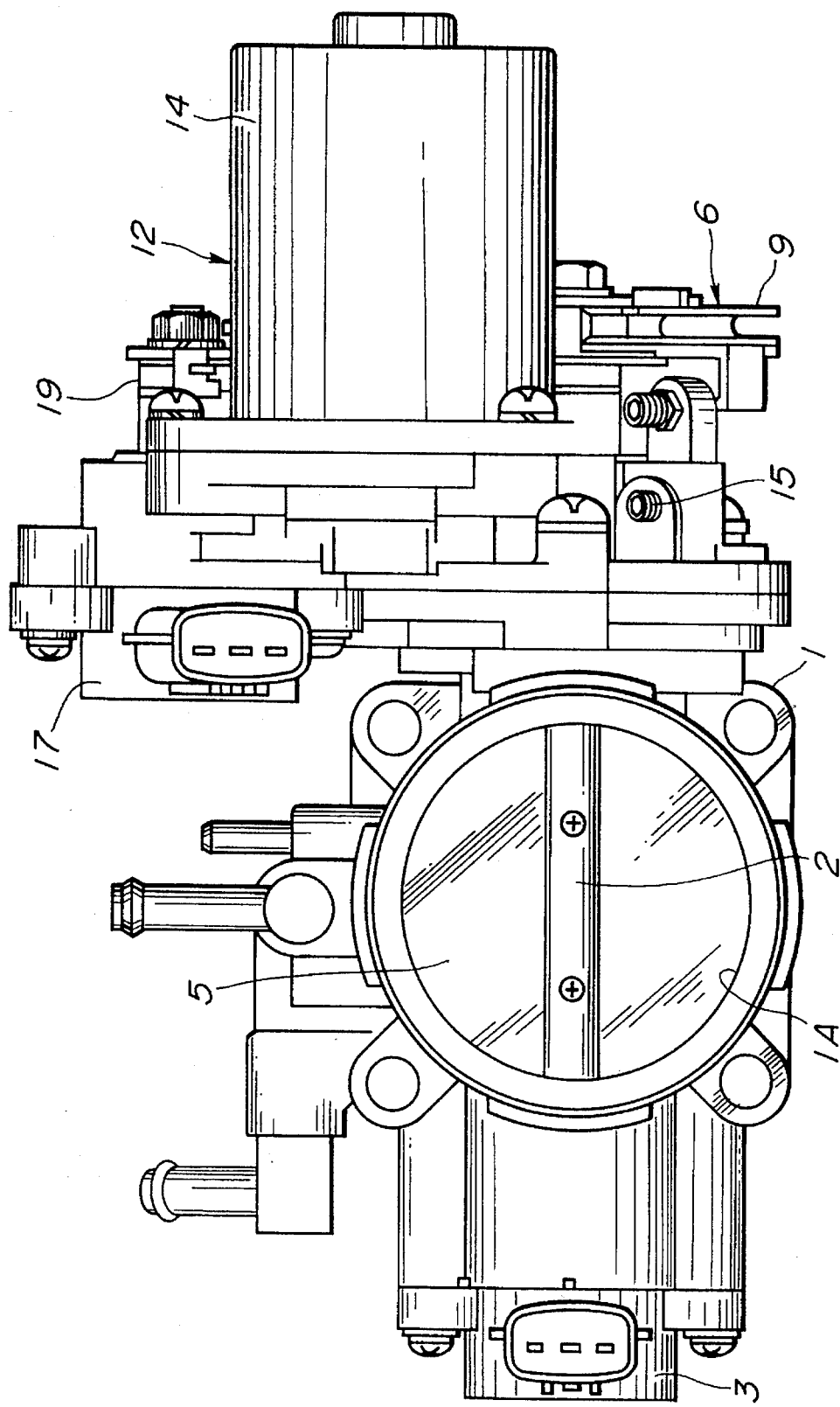
FIG. 1 is a plan view of a throttle valve assembly according to the present invention.

In the following, the present invention will be described in detail with reference to the accompanying drawings.

Referring to FIGS. 1 to 4, there is shown a throttle valve assembly according to the present invention.

In these drawings, designated by numeral 1 is a throttle body in which an air intake passage led to cylinders of the engine is defined. The air intake passage has a throttle chamber 1A merged therewith.

A shaft 2 is transversely arranged in the throttle chamber 1A and pivots about its axis. Although not shown in the drawings, both ends of the shaft 2 are pivotally held by opposed wall portions of the air intake passage through respective bearings.

Figure 2:
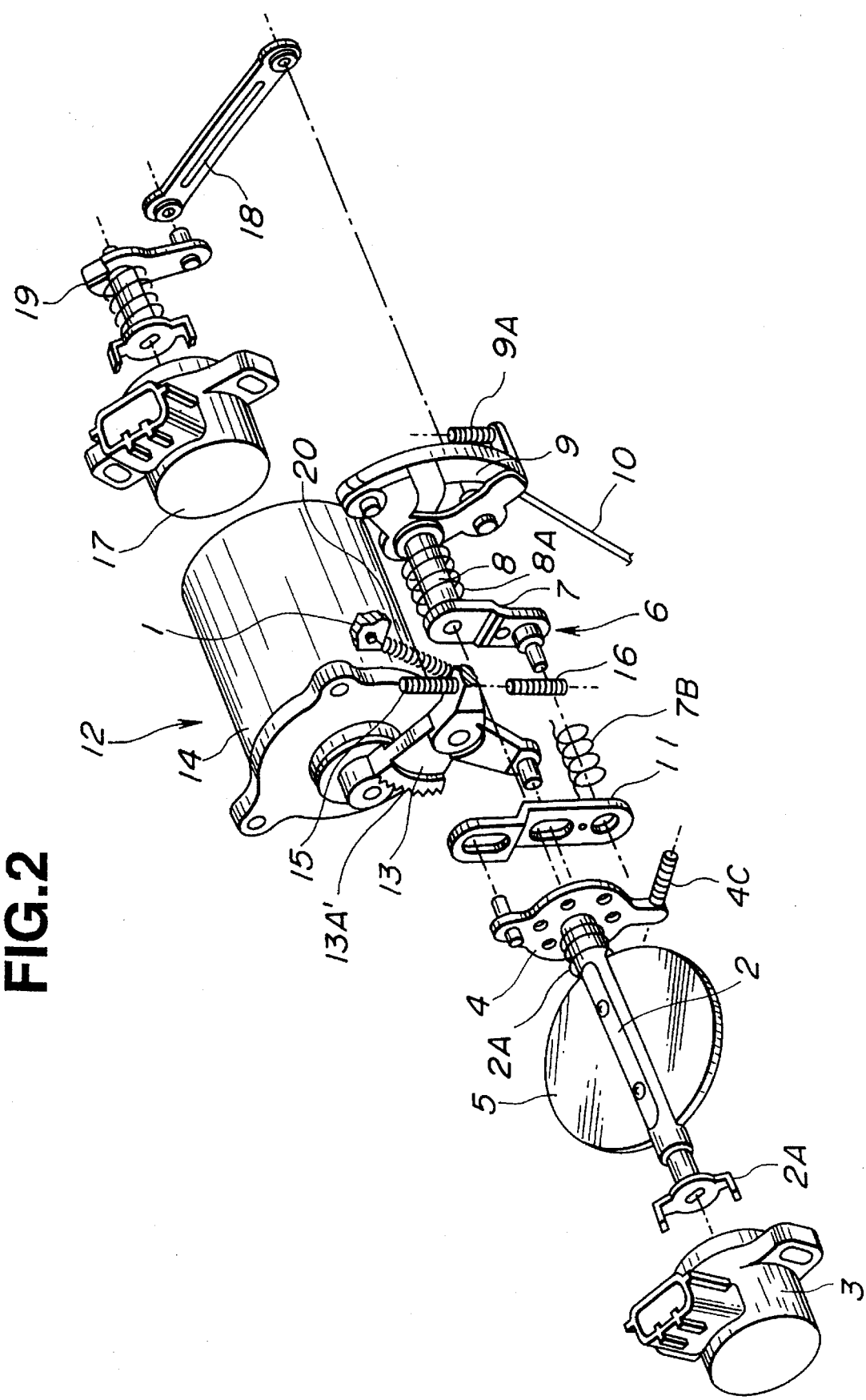
FIG. 2 is an exploded view of the throttle valve assembly of the present invention.

As is best seen from FIG. 2, a circular valve proper 5 (or plate) is fixed to the shaft 2 to pivot therewith. Thus, when pivoted, the circular valve proper 5 controls the amount of air passing through the air intake passage.

One end of the valve shaft 2 has a generally U-shaped plug 2A which is connected to a valve open degree sensor 3

(or angle sensor). The other end of the valve shaft 2 has a rotation plate 4 fixed thereto. Disposed about the valve shaft 2 between the valve proper 5 and the rotation plate 4 is a coil spring which biases the valve proper 5 toward its rest (or closed) position.

Figure 3:
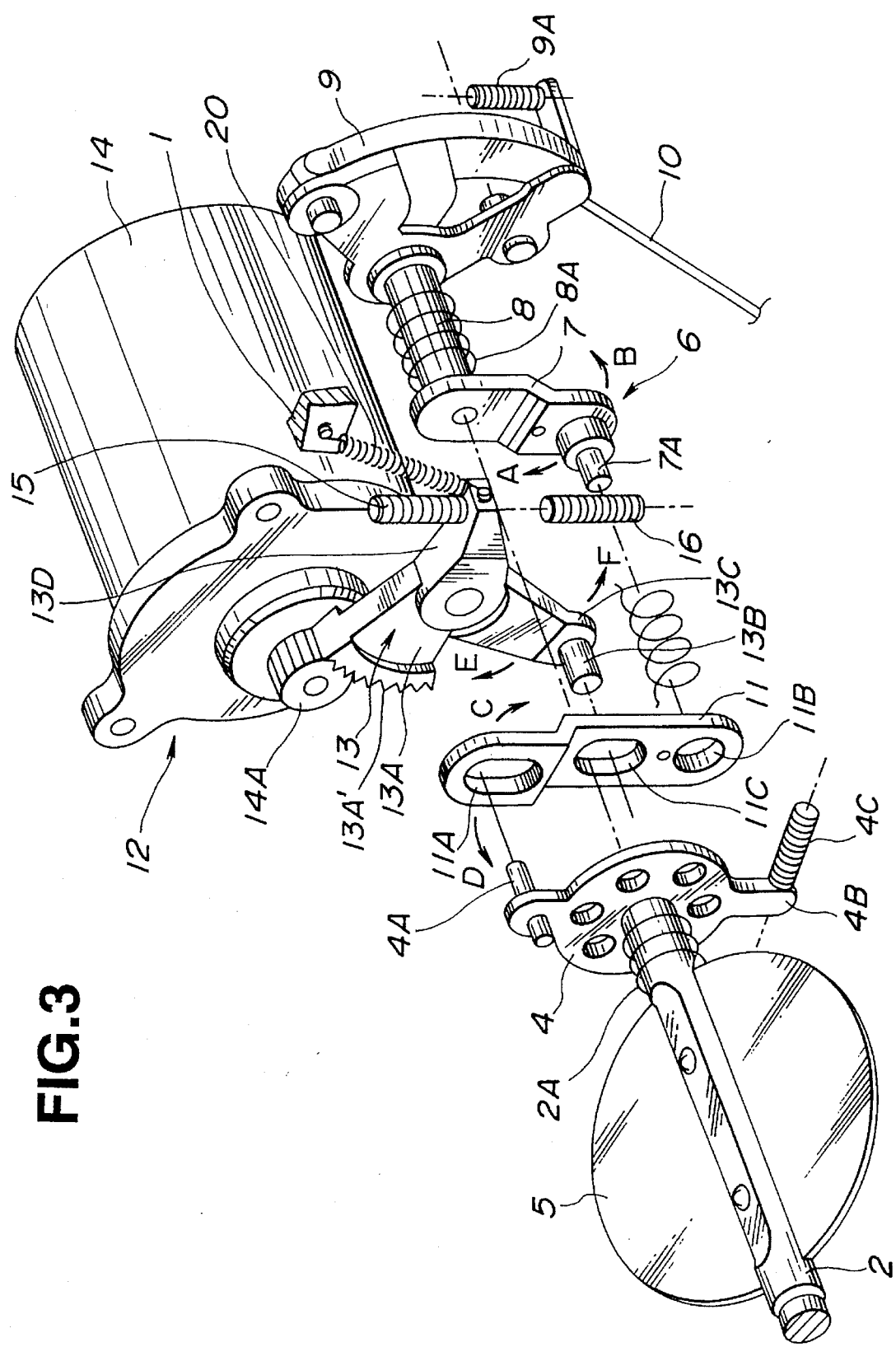
FIG. 3 is an exploded and enlarged view showing some parts shown in FIG. 2.

As is best shown in FIG. 3, the rotation plate 4 is generally circular in shape and has two ear portions at diametrically opposed portions thereof. The lower ear is designated by numeral 4B, which can abut against a threaded stopper pin 4C to stop over turning of the valve proper 5. The upper ear has a first pin 4A fixed thereto. The first pin 4A is loosely engaged with a first engaging opening 11A formed in an after-mentioned link plate 11. As shown, this opening 11A is somewhat elongated.

Designated by numeral 6 is a valve actuating mechanism which is arranged beside the valve proper 5. The valve actuating mechanism 6 generally comprises a rotation lever 7, a rotation shaft 8, a wire drum 9 and the link plate 11, which are assembled in the following manner.

The rotation lever 7 is fixed at one inner end to one end of the rotation shaft 8 to rotate therewith about the axis of the shaft 8. Although not well shown in the drawings, the rotation shaft 8 is rotatably held by the throttle body 1. The rotation lever 7 has at its free end a second pin 7A which is rotatably received in a second engaging opening 11B formed in the link plate 11. This opening 11B is circular. A coil spring 7B is disposed about the second pin 7A to suppress a play of the link plate 11. As shown in FIG. 3, the first and second engaging openings 11A and 11B are formed in the longitudinally opposed end portions of the link plate 11.

The other end of the rotation shaft 8 is fixed to the pivot center of the wire drum 9. Thus, the wire drum 9, the rotation shaft 8 and the rotation lever 7 can rotate about the axis of the rotation shaft 8 as a single unit. A coil spring 8A is disposed about the rotation shaft 8 to bias the unit to pivot counterclockwise in FIG. 3. Designated by numeral 9A is a threaded stopper pin which restricts the counterclockwise movement of the unit. The wire drum 9 grasps at its outer peripheral portion a leading end of a wire 10 which leads to an accelerator pedal "AP" (see FIG. 4) arranged in front of a driver's seat.

The link plate 11 has at is middle portion a third engaging opening 11C which is somewhat elongated. Loosely engaged with this opening 11C is a third pin 13B which is secured to an after-mentioned drive lever 13.

Thus, when the accelerator pedal "AP" is manipulated by a driver, the rotation lever 7 is forced to pivot about the axis of the rotation shaft 8 in both directions "A" and "B", and thus, the link plate 11 is forced to pivot about the third pin 13B in both directions "C" and "D" inducing a pivotal movement of the valve proper 5 about the axis of the valve shaft 2.

Designated by numeral 12 is a traction control device which is arranged beside the valve actuating mechanism 6. The traction control device 12 generally comprises the drive lever 13, an electric motor 14 and a drum angle sensor 17 (see FIG. 2).

The drive lever 13 is pivotally supported at its center portion by the throttle body 1 and has three (that is, first, second and third) radially extending arms 13A, 13C and 13D. The first arm 13A has a sector gear 13A' meshed with a pinion 14A disposed on an output shaft of the motor 14. The second arm 13C has the third pin 13B secured to a leading end thereof. The third arm 13D serves as a stopper arm which restricts the pivoting range of the drive lever 13. For this range restriction, two threaded stopper pins 15 and 16 are arranged in the throttle body 1, which are aligned and put therebetween a leading end of the third arm 13D. Thus, when the pins 15 and 16 are displaced in the axial direction, the pivoting range of the drive lever 13 is varied or adjusted.

A return spring 20 extends between the third arm 13D and the throttle body 1 to bias the drive lever in the direction of "F". It is to be noted that the biasing force produced by the return spring 20 is strong enough to bring about turning of the output shaft of the motor 14 in a deenergized state.

The motor 14 is of a reversible type. That is, upon receiving a control signal produced by a control unit (not shown) based on the rotation condition of the driving wheels, the motor 14 changes the rotation direction of its output shaft thereby pivoting the drive lever 13 in both directions "E" and "F".

The drum angle sensor 17 (see FIG. 2) is connected to the wire drum 9 through a known link mechanism which comprises first and second link members 19 and 18. The drum angle sensor 17 can detect the pivot angle of the wire drum 9. An information signal from the sensor 17, which represents the pivot angle of the wire drum 9, is fed to the control unit.

Thus, it will be appreciated that when the motor 14 is energized to operate the drive lever 13, the valve proper 5 is pivoted or controlled irrespective of movement of the wire drum 9, that is, irrespective of the accelerator pedal "AP". That is, as will become apparent as the description proceeds, when, upon sensing a skidding of the driving wheels, the control unit issues an instruction signal to control the motor 14, the motor 14 operates to pivot the valve proper 5 in a direction to reduce the open degree of the same.

Figure 4:
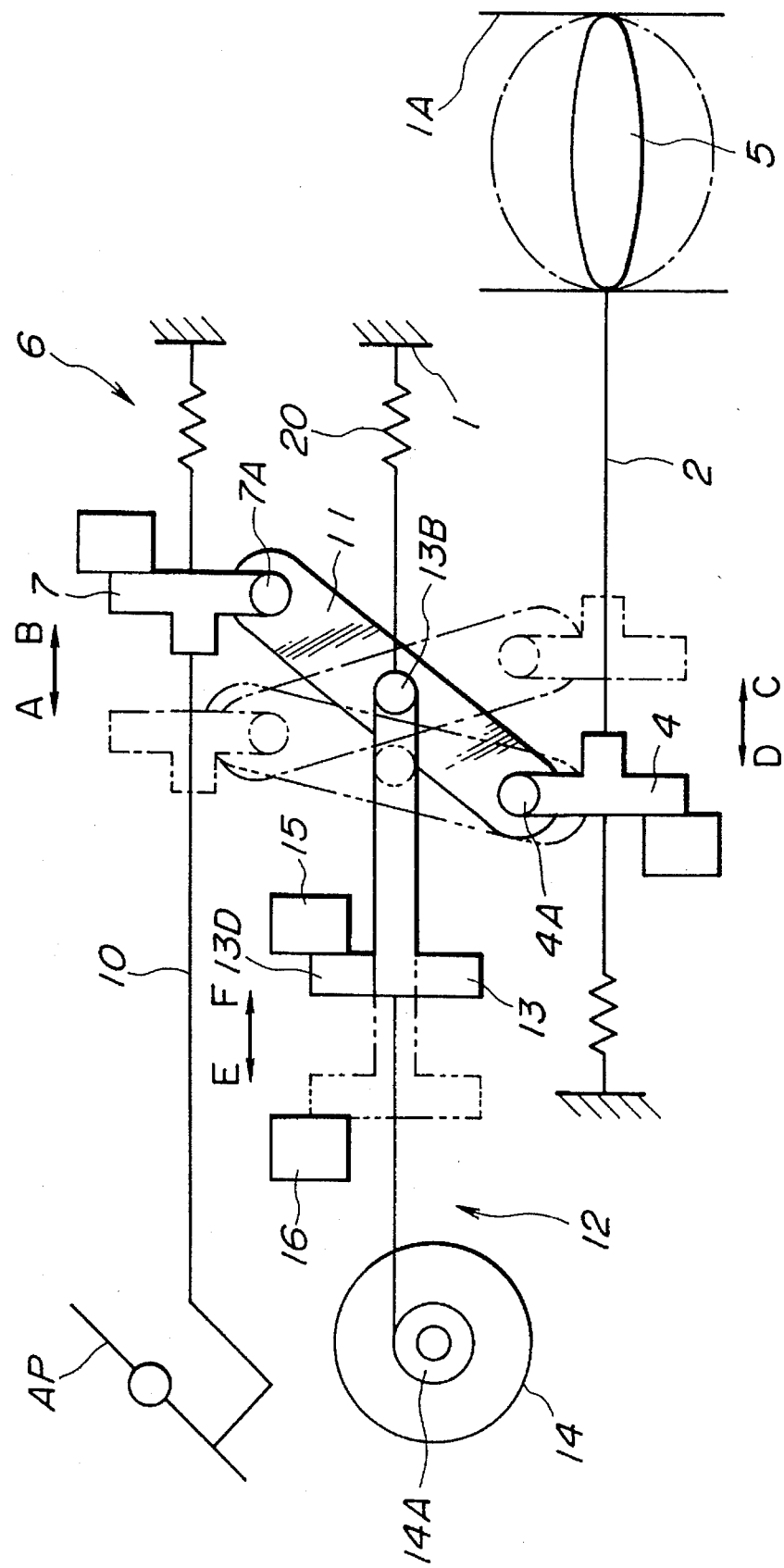
FIG. 4 is a schematic view of the throttle valve assembly of the invention, showing operation of the same.

In the following, operation of the throttle valve assembly of the invention will be described in detail with reference to FIGS. 2, 3 and 4 of the drawings.

For ease of understanding, the description on operation will be commenced with respect to a condition wherein the associated motor vehicle is running and the valve proper 5 is kept in a slightly open position. Under this condition, the parts of the throttle valve assembly assume the positions shown by solid lines in FIG. 4. That is, the third arm 13D of the drive lever 13 abuts against the upper stopper pin 15, and thus, the biasing force produced by the return spring 20 is the minimum.

When now the accelerator pedal "AP" is further depressed by a certain degree, the rotation lever 7 is pivoted in the direction of the arrow "A" and thus the link plate 11 is pivoted in the direction of the arrow "C" about the third pin 13B. With this, the valve proper 5 is pivoted in a direction to increase its open degree. Thus, a larger amount of fresh air is fed to the engine thereby increasing the output power of the engine. Under this condition, the driving wheels are driven with a larger driving torque and thus undesired skidding of the wheels tends to occur.

When judging a skidding of the driving wheels by analyzing information signals issued from various skid responsive sensors (not shown), the control unit issues a control signal to the motor 14 with reference to an information signal issued from the drum angle sensor 17. With this, the motor 14 is energized to run to pivot the drive lever 13 in the direction of the arrow "E" against the biasing force of the return spring 20, so that the link plate 11 is pivoted in the direction of the arrow "D" about the second pin 7A of the rotation lever 7. Accordingly, the valve proper 5 is forced to pivot in a direction to reduce its open degree against the intention of the accelerator pedal "AP". Thus, the engine output is lowered and thus the driving torque applied to the driving wheels is lowered thereby suppressing occurence of the undesired skidding of the driving wheels.

It is now to be noted that under this condition, the biasing force of the spring 20 applied to the drive lever 13 is much greater than that produced when the third arm 13D abuts against the upper stopper pin 15.

In the following, an advantageous operation of the throttle valve assembly will be described, which takes place when the drive lever 13 fails to make normal operation.

That is, when, under control by the traction control device 12, the drive lever 13 suddenly gets out of order due to, for example, damage of the motor 14, ill-meshing between the pinion 14A and the sector gear 13A' and/or the like, the larger biasing force kept stored by the spring 20 now forces the drive lever 13 to return to its rest position. Thus, thereafter, the control of the valve proper 5 by the accelerator pedal "AP" is no longer affected by the traction control device 12. In other words, thereafter, the open degree of the valve proper 5 is determined by only the accelerator pedal "AP", and thus the undesired power drop of the engine due to failure of the drive lever 13, which would occur in the afore-mentioned conventional throttle valve assembly, does not occur any longer in the present invention.

Figure 5:
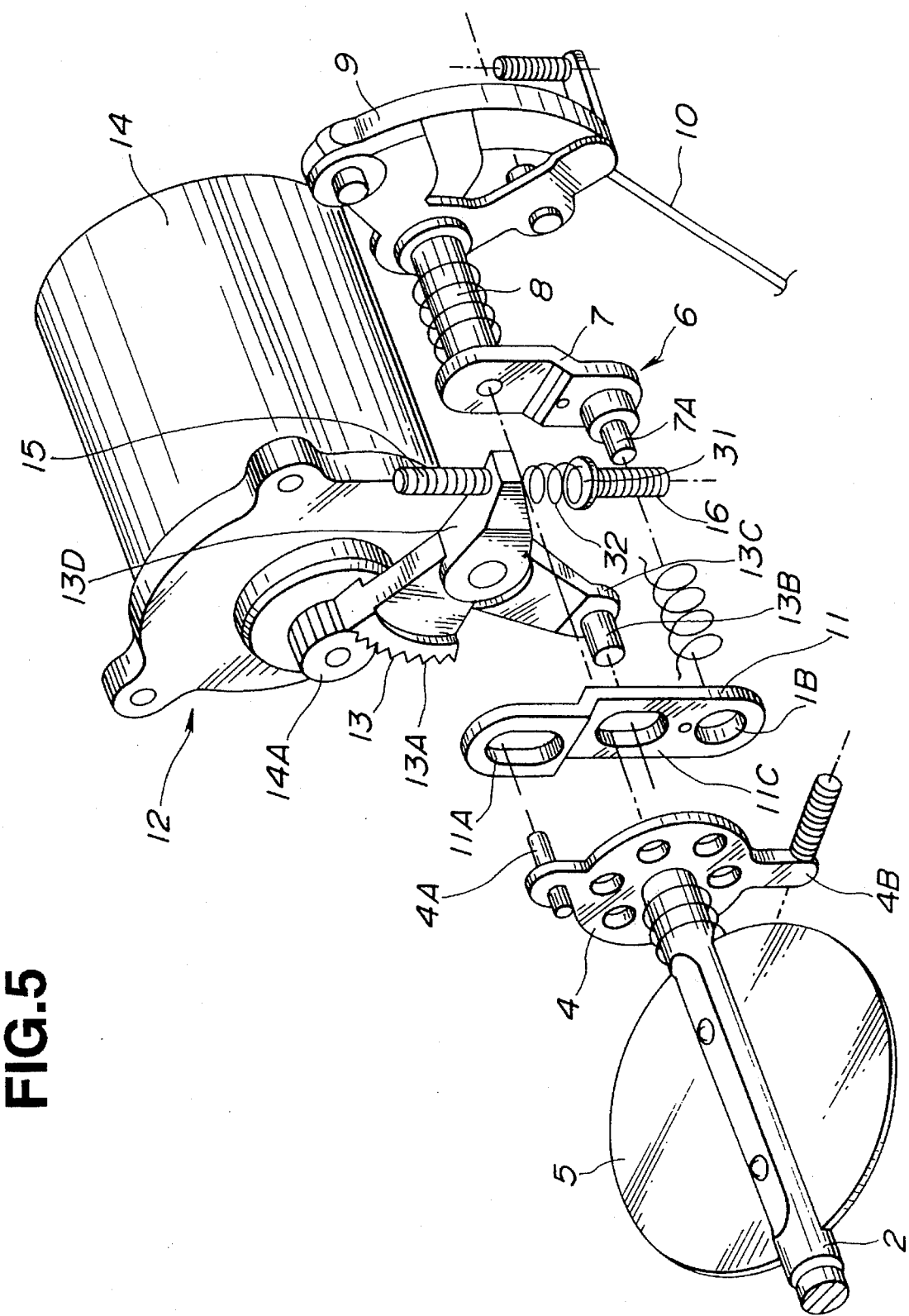
FIG. 5 is a view similar to FIG. 3, but showing a first modification of the present invention.

Referring to FIG. 5, there is shown a first modification of the present invention.

In this modification, in place of the spring 20 extending between the third arm 13D of the drive lever 13 and the throttle body 1, a coil spring 32 is used which is compressed between the third arm 13D and the lower stopper pin 16. In order to stably hold the spring 32, the stopper pin 16 has a spring seat 31 fixed thereto.

Figure 6:
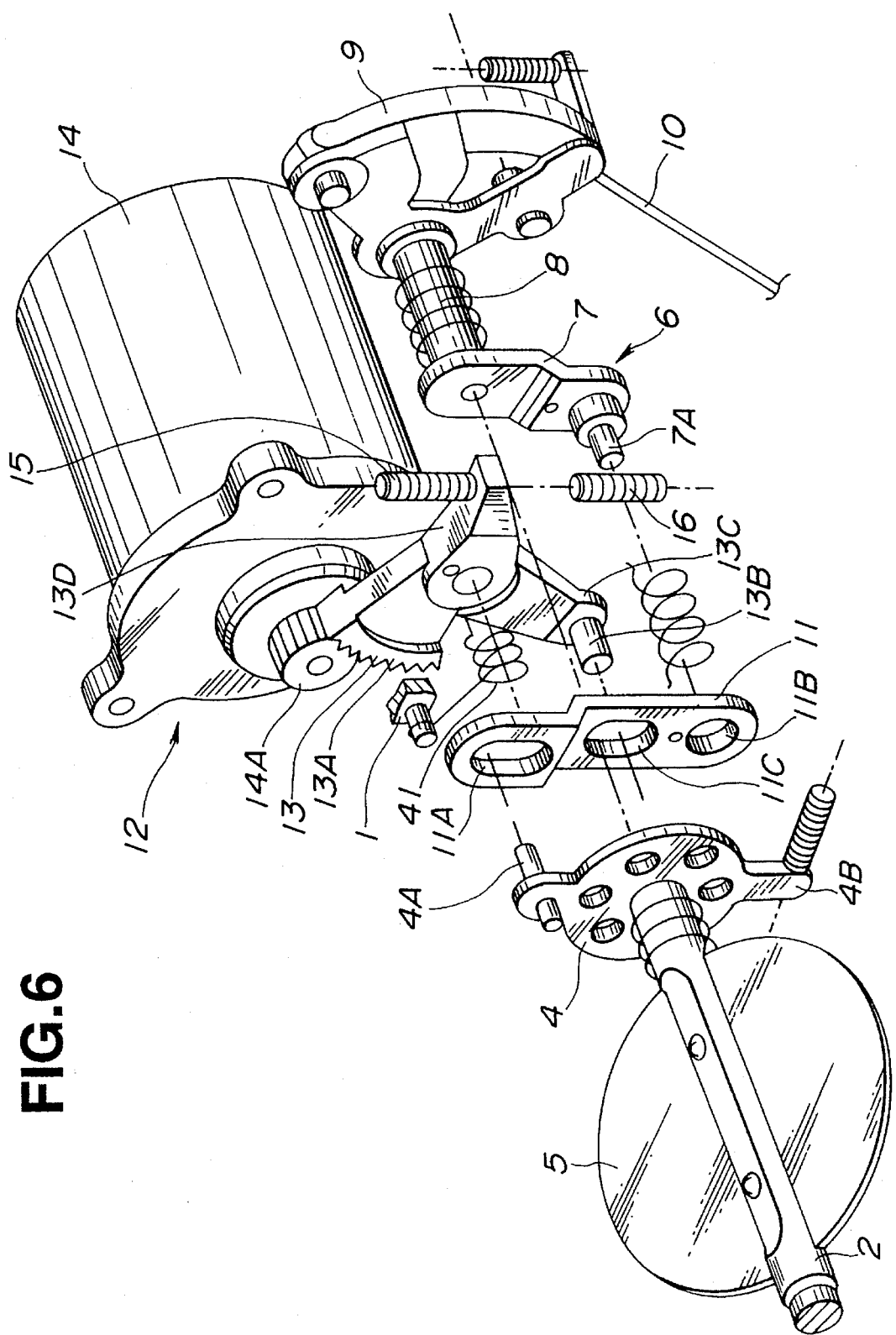
FIG. 6 is a view similar to FIG. 3, but showing a second modification of the present invention.

Referring to FIG. 6, there is shown a second modification of the present invention.

In this modification, a coil spring 41 is used, which is disposed about a pivot shaft (not shown) of the drive lever 13. One end of the spring 41 is hooked to the drive lever 13 and the other end is hooked to the throttle body 1. Of course, the spring 41 is arranged to increase its biasing force when the drive lever 13 is pivoted in a direction to increase the open degree of the valve proper 5.

What is claimed is:

1. A throttle valve assembly comprising:

a body defining an air intake passage therein;

a valve proper pivotally installed in said air intake passage to control the amount of air flowing therethrough;

a first valve actuator for pivoting said valve proper in accordance with a first information;

a second valve actuator for pivoting said valve proper in accordance with a second information, said second valve actuator having a rest condition wherein the function of the second valve actuator is fully lost; and first means for forcing the second valve actuator to take said rest condition when said second valve actuator gets out of order.

2. A throttle valve assembly as claimed in claim 1, in which said first means is a spring which biases said second valve actuator in a direction to take said rest condition.

3. A throttle valve assembly as claimed in claim 2, in which said spring is arranged to increase its biasing force when said second valve actuator operates normally.

4. A throttle valve assembly as claimed in claim 3, in which said first means further comprises an adjustable stopper by which a part of said second valve actuator is stopped when said second valve actuator takes said rest condition.

5. A throttle valve assembly as claimed in claim 1, in which said second valve actuator comprises:

an electric motor having an output shaft;

a drive lever pivotally supported at its center portion by said body, said drive lever being biased to pivot to a given angular position by said first means;

gear means arranged between said output shaft of the motor and said drive lever so that rotation of said output shaft induces a pivot movement of said drive lever relative to said body;

a link plate pivotally held at its middle portion by said drive lever, said link plate having one end to which a given part of said first valve actuator is pivotally connected;

a rotation plate secured to said valve proper to pivot therewith, said rotation plate having one end which is pivotally connected with the other end of said link plate.

6. A throttle valve assembly as claimed in claim 5, in which said first means is a spring which biases said drive lever in a direction to pivot said link plate about the given part of said first valve actuator in a direction to increase the open degree of said valve proper through said rotation plate.

7. A throttle valve assembly as claimed in claim 6, in which said spring is arranged to increase its biasing force when pivoted by the electric motor in a direction to decrease the open degree of said valve proper through said rotation plate.

8. A throttle valve assembly as claimed in claim 7, further comprising a pair of stoppers by which the pivotal movement of said drive lever in one and the other directions is restricted.

9. A throttle valve assembly as claimed in claim 8, in which one of said stoppers is arranged to abut with said drive lever and thus stop further pivotal movement of the drive lever when said drive lever is forced to pivot by the force of said spring.

10. A throttle valve assembly as claimed in claim 9, in which said first valve actuator comprises:

a pivotal wire drum connected to an accelerator pedal through a wire;

a rotation lever connected to said wire drum to pivot therewith, said rotation lever having at its free end a pin; and said link plate, said link plate having said one end an opening with which said pin of said rotation lever is pivotally engaged.

11. A throttle valve assembly as claimed in claim 10, in which said spring extends between said body and a part of said body.

12. A throttle valve assembly as claimed in claim 10, in which said spring is compressed between a part of said drive lever and the other of the paired stoppers.

13. A throttle valve assembly as claimed in claim 10, in which said spring is a coil spring which is disposed about a pivot shaft of said drive lever, said coil spring having one end hooked to said body and the other end hooked to said drive lever.

14. A throttle valve assembly comprising:

a body defining an air intake passage therein;

a valve proper pivotally installed in said air intake passage to control the amount of air flowing therethrough;

a pivotal wire drum connected to an accelerator pedal through a wire;

a rotation lever connected to said wire drum to pivot therewith, said rotation lever having at its one end a second pin;

a link plate pivotally held at its middle portion by a third pin, said link plate having at one end a first opening and at the other end a second opening, said second opening being pivotally engaged with said second pin;

a rotation plate connected to said valve proper to pivot therewith, said rotation plate having a first pin which is pivotally engaged with said first opening of said link plate;

a drive lever pivotally supported at its center portion by said body, said drive lever having at its radially extending portion said third pin;

an electric motor having an output shaft;

gear means arranged between said output shaft of the motor and a radially extending portion of said drive lever so that rotation of said output shaft induces a pivot movement of said drive lever; and a spring for biasing said drive lever to pivot in a direction to pivot said link plate about said second pin in a direction to increase the open degree of said valve proper through said rotation plate.

* * * * *